July 11, 1950     J. E. HALE ET AL     2,514,488
AMPHIBIOUS VEHICLE

Filed Oct. 26, 1945     10 Sheets-Sheet 1

INVENTORS
JAMES E. HALE
JOHN H. COX
JOHN G. KREYER
BY
ATTORNEYS

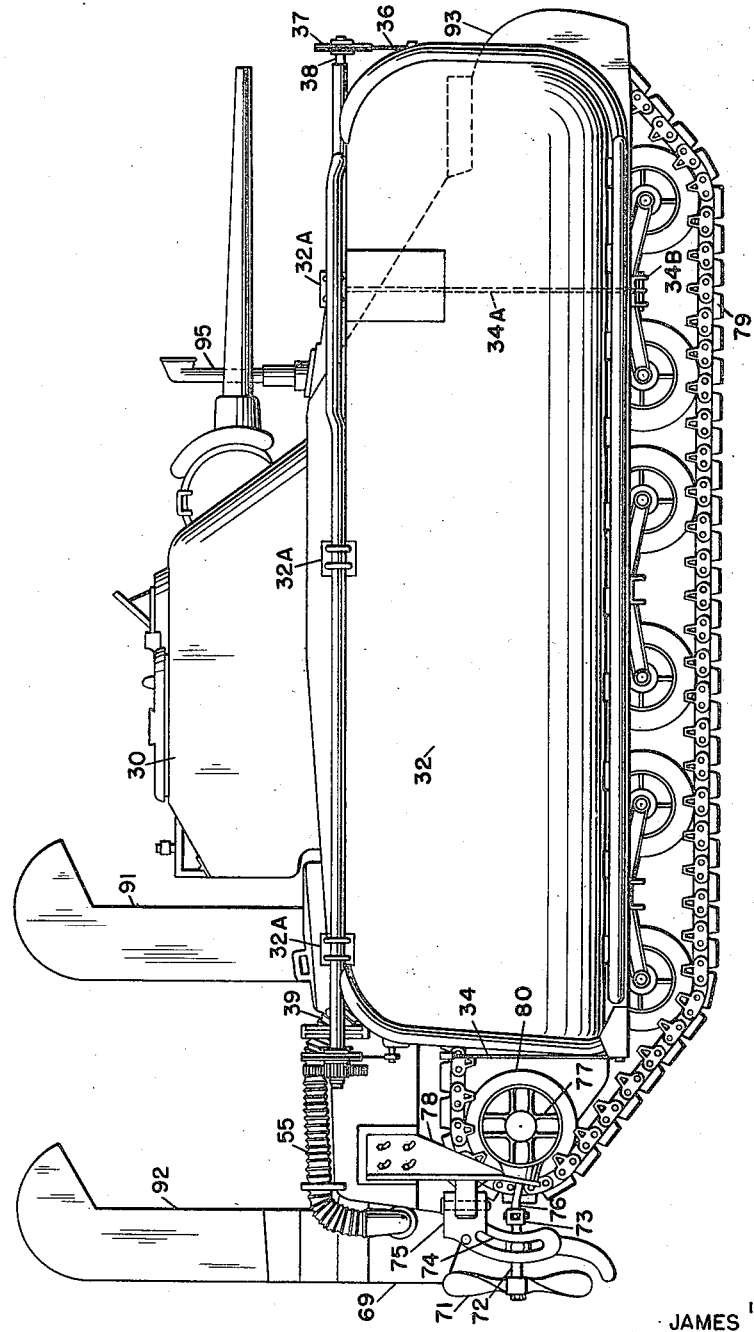

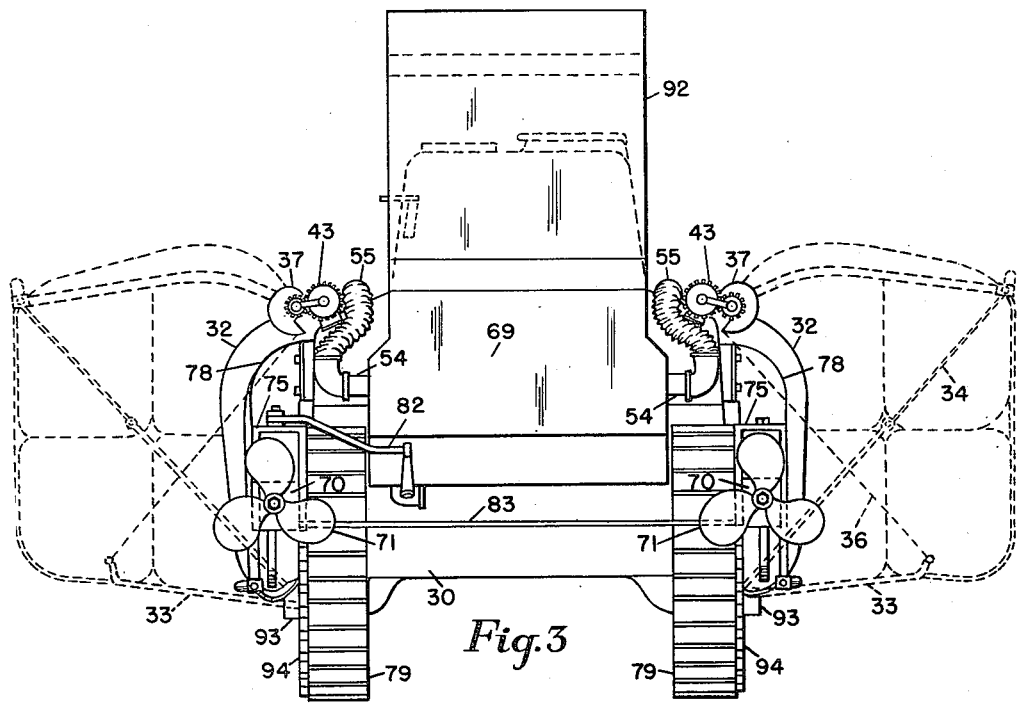
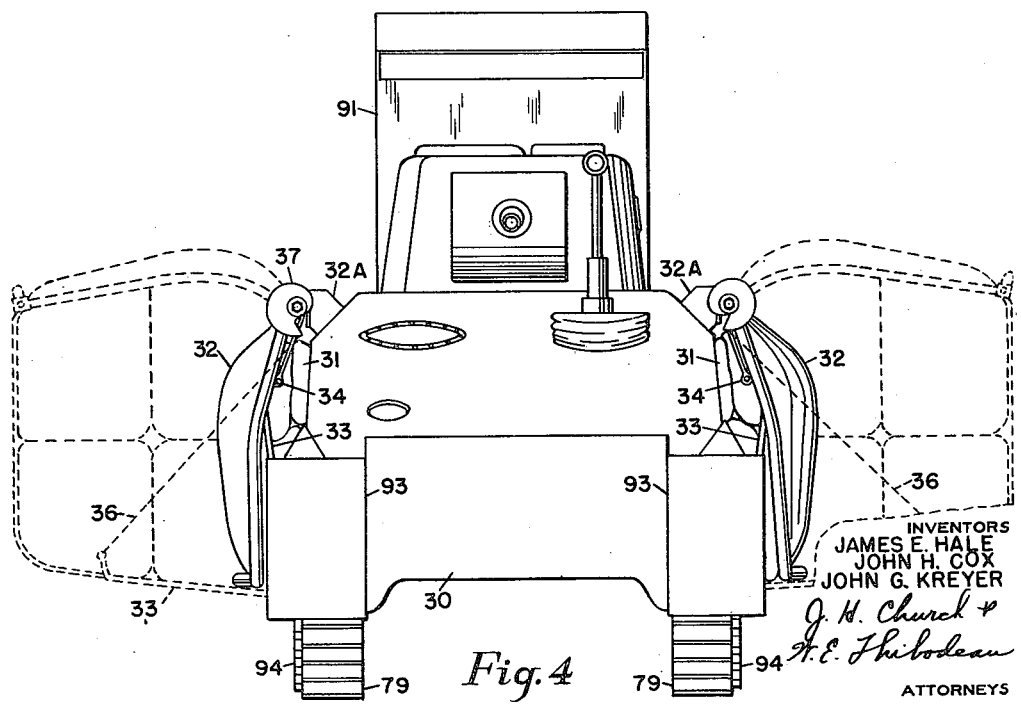

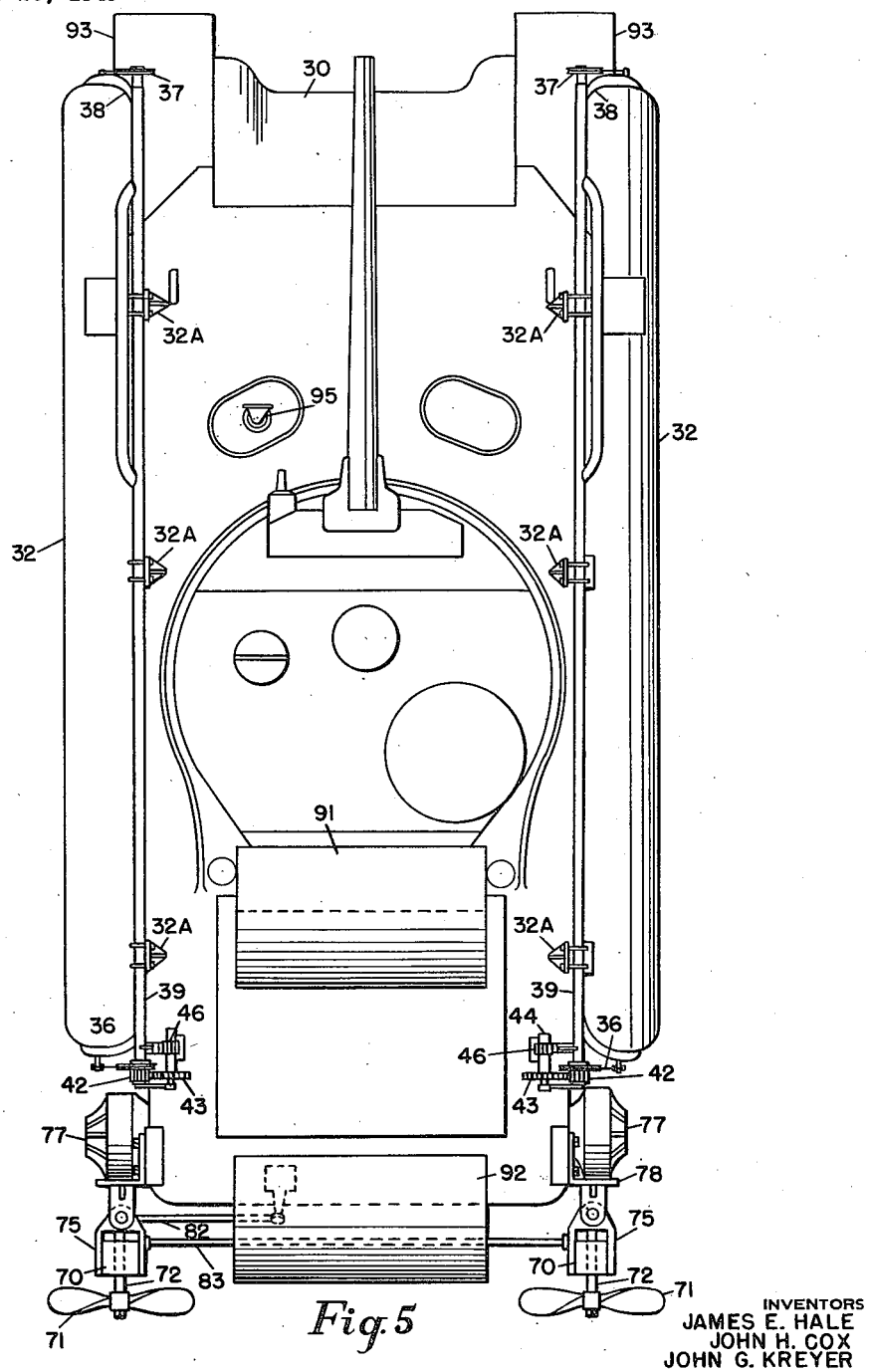

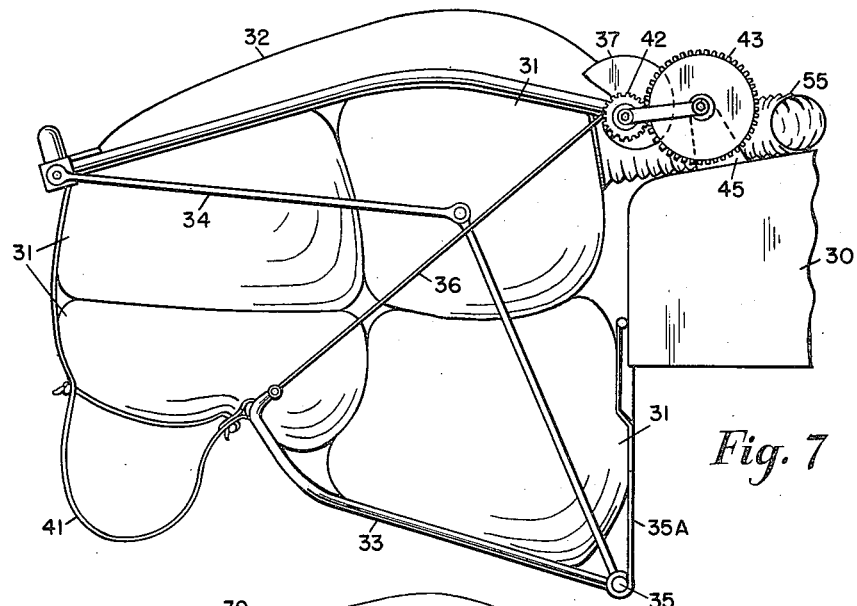
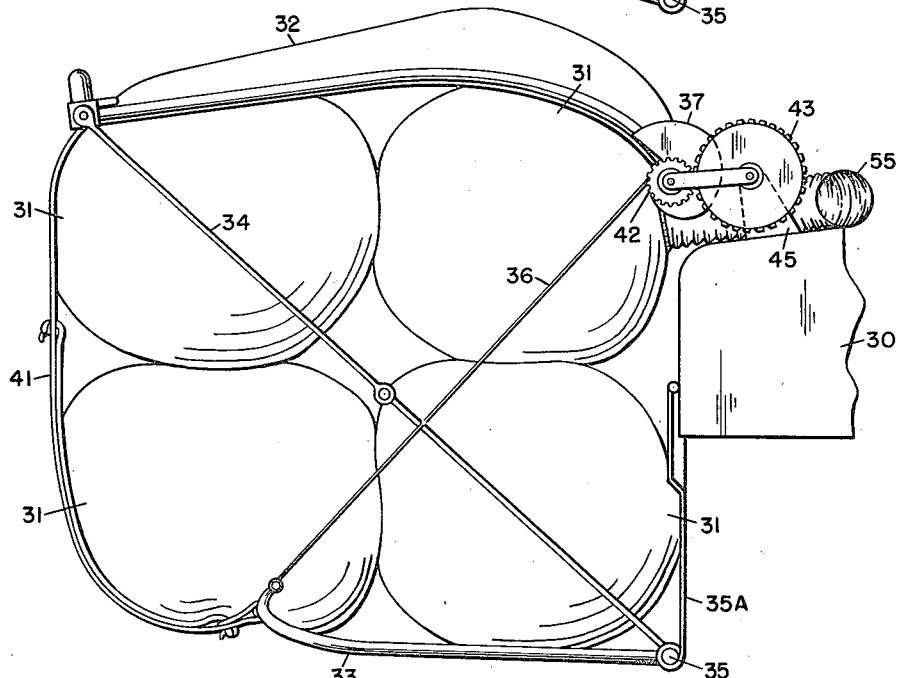
Fig. 7
Fig. 6

July 11, 1950     J. E. HALE ET AL     2,514,488
AMPHIBIOUS VEHICLE

Filed Oct. 26, 1945     10 Sheets—Sheet 6

INVENTOR
JAMES E. HALE
JOHN H. COX
JOHN G. KREYER

BY

ATTORNEYS

July 11, 1950  J. E. HALE ET AL  2,514,488
AMPHIBIOUS VEHICLE
Filed Oct. 26, 1945  10 Sheets-Sheet 7

INVENTORS
JAMES E. HALE
JOHN H. COX
JOHN G. KREYER
BY
J. H. Church & H. E. Thibodeau
ATTORNEYS July 11, 1950  J. E. HALE ET AL  2,514,488
AMPHIBIOUS VEHICLE
Filed Oct. 26, 1945  10 Sheets-Sheet 8

INVENTORS
JAMES E. HALE
JOHN H. COX
BY JOHN G. KREYER
J. H. Church & H. E. Thibodeau
ATTORNEYS July 11, 1950 J. E. HALE ET AL 2,514,488
AMPHIBIOUS VEHICLE
Filed Oct. 26, 1945 10 Sheets-Sheet 9

INVENTORS
JAMES E. HALE
JOHN H. COX
JOHN G. KREYER
BY
J. H. Church & H. E. Thibodeau
ATTORNEYS Patented July 11, 1950

2,514,488

UNITED STATES PATENT OFFICE 2,514,488

AMPHIBIOUS VEHICLE

James E. Hale, Akron, John H. Cox, Seville, and John G. Kreyer, Akron, Ohio

Application October 26, 1945, Serial No. 624,798

10 Claims. (Cl. 115—1)

This invention relates to amphibious vehicles, especially to armored amphibious military vehicles, and means for rendering land vehicles amphibious.

The ability to perform an unexpected and novel maneuver, which is fundamentally sound in character, has always been the aim of all good generals in warfare. To this end, military leaders continually are searching for new weapons and for novel adaptations of previous types of weapons. Often a brilliant idea is conceived but only very limited time is available to work out such idea, or to build the mechanisms required in the execution of the idea before the idea must be used to obtain full advantages therefrom.

In these days of modern warfare where battle conditions change rapidly and warfare is of a very fluid nature, provision of amphibious vehicles is essential so that mobile units are able to traverse any water barriers encountered. Various types of amphibious vehicles have been provided heretofore, but all of them, in general, have been designed for special purposes and have either very light, or no, armor thereon. Hence, no real armored amphibious vehicle ever has been made heretofore and its provision and use would be a surprise such as the enemy might not be prepared to face. It will be seen that the use of standard, or substantially standard vehicles for such amphibious operation would facilitate the operation greatly.

With the foregoing and other factors in view, it is an object of this invention to provide a novel, amphibious, armored tank.

Another object is to provide a relatively easily positioned flotation kit for attachment to vehicles in the field to render same amphibious.

Another object of the invention is to provide flotation means for a tank, which flotation means is adapted to inflate or deflate automatically, as desired by the operator of the tank.

Another object of the invention is to provide flotation means for an armored vehicle, which means is adapted to compress itself into a minimum of space upon deflation.

Another object is to float a combat vehicle in such a manner as to permit the use of the firepower of such vehicle even while in water.

A further object of the invention is to provide reusable flotation means for a vehicle.

Another object is to control both the inflation and deflation of flotation means of an amphibious armored vehicle from within the vehicle.

Yet another object of the invention is to use exhaust gas from a combustion motor to inflate pontoons on an amphibious vehicle and maintain the desired, but not permit excessive, pressure in such pontoons while the vehicle is in operation.

A further object is to provide an amphibious vehicle with pontoons that can be inflated in a short period and have pressure maintained therein even though the pontoons may have a number of small holes therein.

Still another object is to provide an amphibious vehicle with an uncomplicated, removable drive connection for coupling a propeller to the vehicle drive means.

Another object of the invention is to provide mobile inflation means for a vehicle.

Another object is to provide a large volume of low pressure gas for inflation purposes on an amphibious internal combustion vehicle.

Another object of the invention is to provide a vehicle with flotation means having shields to protect such flotation means against small arms gunfire and the like.

A further object of the invention is to provide an amphibious vehicle with flotation means suitable for supporting a vehicle of substantially greater weight than the volume of water it displaces, such flotation means being constructed and arranged to be permanently carried by the vehicle without interfering appreciably with its operation upon land.

The foregoing and other objects of the invention will be made apparent by reference to the accompanying description of the improved armored vehicle, that is shown in the accompanying drawings, in which:

Fig. 2 is a side elevation of the tank of Fig. 1, with the pontoons deflated;

Fig. 3 is a rear elevation of the tank of Fig. 1, with the pontoons and supporting structure being shown in deflated position, but with the inflated positions thereof being indicated;

Fig. 4 is an elevation of the tank of Fig. 1, with the inflated pontoon positions being indicated, but with same shown in deflated position;

Fig. 5 is a plan of the tank of Fig. 1, with the pontoons deflated;

Fig. 6 is a fragmentary rear end elevation of the pontoons, when inflated, and supporting means;

Fig. 7 is a rear elevation, similar to Fig. 6, showing the pontoons partially deflated;

Figure 1:
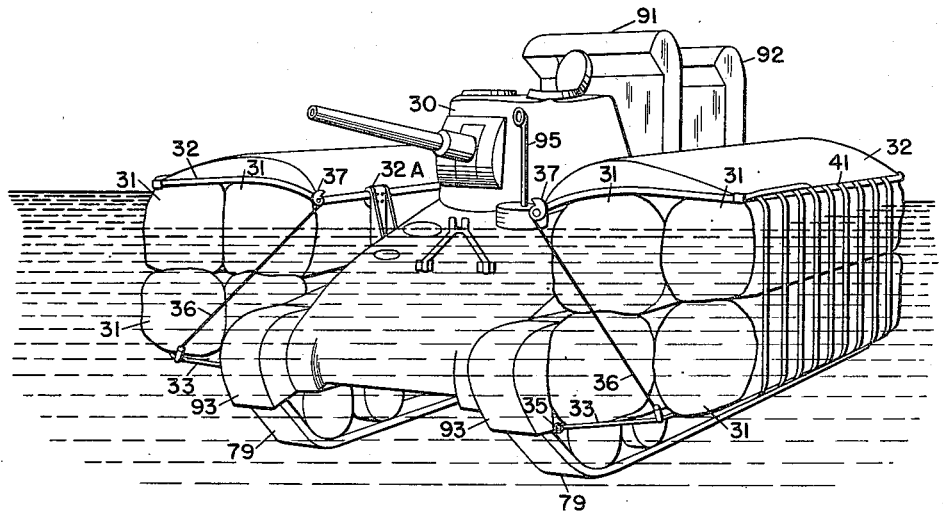
Fig. 1 is a perspective view of a tank embodying the invention, with the pontoons inflated.
Figure 8:
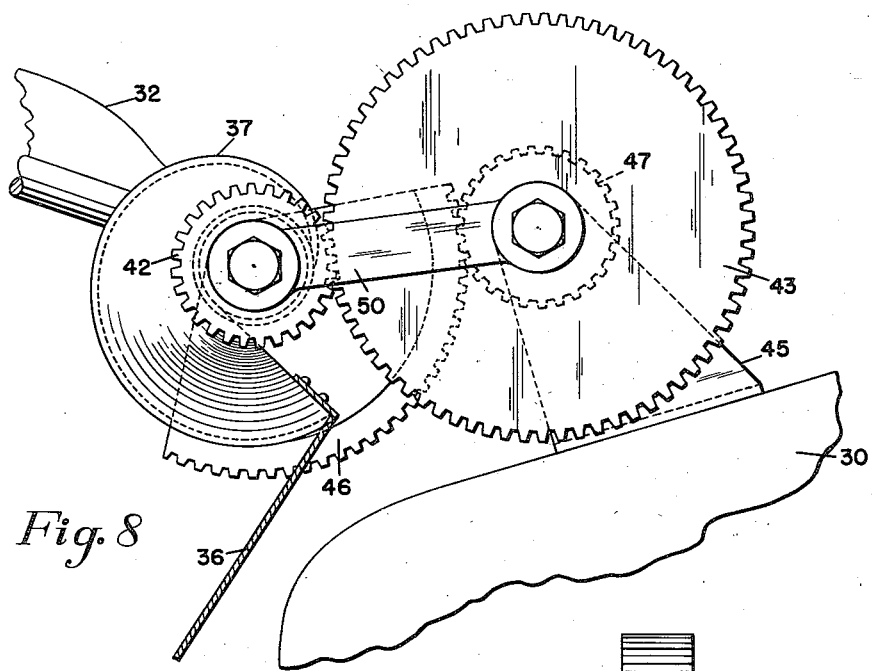
Fig. 8 is a fragmentary side elevation of the means for controlling movement of the pontoon supporting structures.
Figure 9:
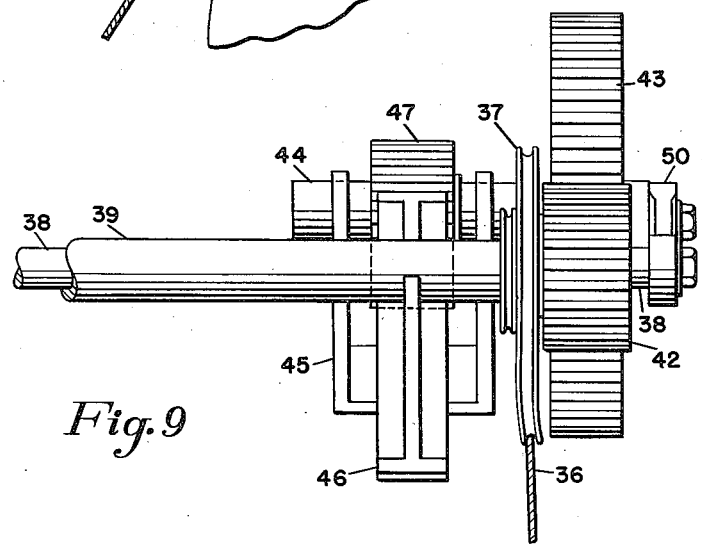
Fig. 9 is an elevation of the apparatus shown in Fig. 8.

Referring in detail to the improved amphibious vehicle of the invention, Fig. 1 shows a standard design military tank 30 which has a plurality of pontoons 31, which are substantially cylindrical when inflated but which may be collapsed when deflated, secured to and extending substantially the length of the sides thereof. The tank 30 has a body that weighs substantially more than the volume of water that it displaces. The pontoons 31 are held in place and their flotation lift is transmitted to the tank by top shields or pans 32 pivotally secured to the sides of the upper surface of the tank 30. Lower support structures or racks 33, which also are pivotally associated with the tank, are provided to aid in securing the pontoons to the tank. Tension arms 34, which are made in sections pivotally secured together so as to fold upon themselves when the pontoons are deflated, are secured to the outer ends of the shields 32 and to the rear portions of tubular members 35. These members 35 extend along the sides of the tank and are secured to the suspension points of the tank, while cables 34a connect to a forward portion of each of the shields 32 and extend through sleeves (not shown) formed in the pontoons 31 to brackets 34b carried on the lower section of the tank to aid in limiting the upward swing of the shields. The tubular members 39 are also used in positioning the racks 33 on the tank. Cables 36 connect the outer end portions of the racks 33 to the upper portion of the tank, as hereinafter set forth, to limit downward arcuate movement of the racks. Metal sheets 35a are associatd with the sides of the tank in any suitable manner to separate the pontoons 31 from the bogie mechanism of the tank 30.

The pontoons 31 are held in place between the shields 32 and racks 33 by means of a plurality of flexible straps 41, which extend between the outer portions of the shields and the racks.

The movement and the positions of the shields 32 and racks 33 is controlled by the air or gas pressure within the pontoons 31. That is, when the pontoons are without pressure therein, the weight of the top shields 32, which normally are made from sheet armor plate, is such that the shields will pivot around their hinges 32a, and rotate down to a position substantially flush with the sides of the tank. The pontoons and inflation system preferably are in a compact position when not in use, so as to occasion minimum interference with the tank operation. To this end, means are provided for drawing the racks 33 upwardly of their normal positions as the pontoons are deflating so as to move the racks through an arc swung about their inside edges whereby the racks 33 are also flush with the sides of the tank 30 and are inside the pans 32. This result is achieved by the connection of the pans 32 and racks 33 through suitable positive acting, synchronization means that may include cables 36 that connect to cams 37, carried on rods 38 which are journalled on and extend the length of the tank 30 adjacent each side thereof, at the ends of the rods. The rods 38 extend through tubular members 39, which may be formed on the inner edges of the shields 32 and project slightly from both ends of such members 39. Movement of the cams 37 and thus that of the racks 33 is controlled by gears 42 carried on and positioned at the rear ends of the rods 38, immediately adjacent the cams 37. The gears 42 engage with relatively large gears 43 that are carried by stub shafts 44 which are journalled in brackets 45, carried on the upper surface of the tank adjacent the rear end of the pans 32. Then, arcuate movement from the shields 32 is transmitted to the stub shafts 44, by means of gear segments 46, that are secured to the tubular member 39, and engage with gears 47 carried by the stud shafts. Tie links 50 connect the ends of the rods 38 to the shafts 44 to aid in positioning the ends of the rods. The gears connecting the tubular members 39 to the rods 38 and cams 37 are so designed that relatively small downward movement of the outer portion of the shields 32 produces a relatively large arcuate movement upwardly of the racks 33, which movement is partially indicated in Figs. 6 and 7. Thus the racks 33 affect the major initial compressing action of the pontoons, which action is automatically produced by the gravity pull on the pans 32 as soon as the pontoons 31 are opened for exhaust purposes. Upon inflation of the pontoons, as hereinafter described, the pans 32 are swung up through an arc and the racks 33 swing down gradually as the air pressure set up in the pontoons lifts the pans up. Thus the positions of the pans 32 and racks 33 are controlled by the inflation or deflation of the pontoons, which can be controlled from within the tank 30, as will be hereinafter described. No exposure of personnel is required to change the tank from a water to a land vehicle. In fact, such change can be effected while the tank is in transit on land.

Figure 10:
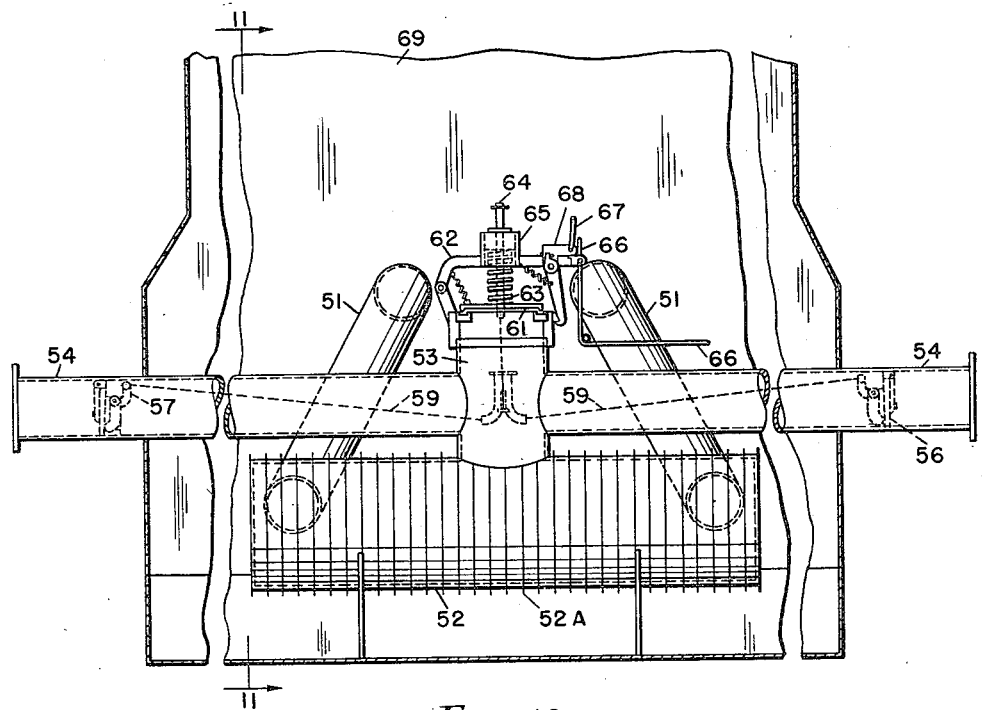
Fig. 10 is a fragmentary section of the expansion chamber and associated gas conveying apparatus of the tank.
Figure 11:
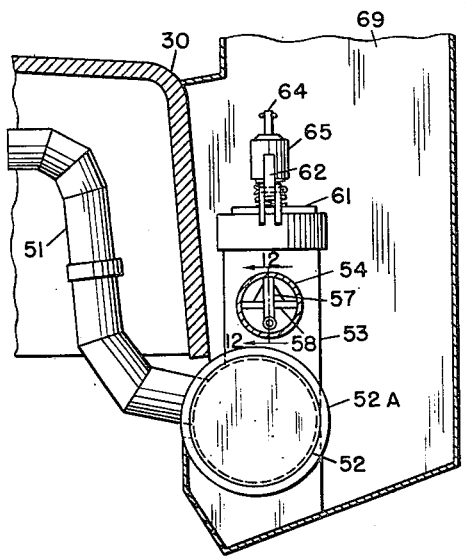
Fig. 11 is a fragmentary section taken on line 11—11 of Fig. 10.
Figure 12:
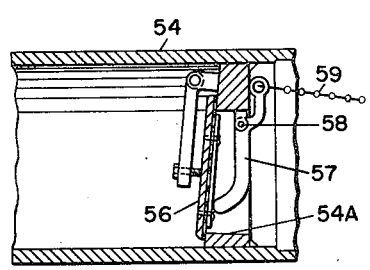
Fig. 12 is an enlarged section of a valve, used in the control of gas flow, shown in Fig. 10.

It has been discovered that the internal combustion engine (not shown) of the tank 30 will operate against a small back pressure such as up to about 10 pounds per square inch. Thus, due to the large volume of exhaust gas obtainable from an internal combustion engine, it is possible to use such exhaust gases after partial expansion thereof (which in turn cools such gases appreciably) to inflate the pontoons 31. Exhaust pipes 51, best shown in Figs. 10 and 11 of the drawings, connect an expansion tank 52 to the motors of the tank. Preferably the chamber 52 has integral cooling fins 52a formed on its outer surface and, if desired, a stream of cooling air may be blown against the chamber surface by suitable means, with such air then exhausting from the tank through its regular exhaust means, hereinafter disclosed. The gas received in the expansion chamber 52 moves therefrom through a flue 53, which connects to tubes 54, which are, in turn, connected to flexible tubes 55 that lead to each series of pontoons 31. The tubes 54 are provided with valves 56 therein that seat on shoulders 54a positioned within the tubes 55 for controlling the flow of gases therethrough. The valves 56 also function as gas exhaust ports for the pontoons 31, as hereinafter described. Bell cranks 57 are secured to pins 58 that mount the valves 56, and are journalled in the tubes 54 for rotating the valve means onto and off of their seats in the tubes 54. Suitable flexible controls 59 connect to the free ends of the bell cranks 57 for opening the valves 56.

It will be seen that the pressure set up in the pontoons holds the valves 56 on their seats when the pontoons are inflated and the controls 59 have not pulled the valves from their seats. An exhaust valve 61 is connected to the upper end of the flue 53 and it is provided with a control arm 62 that is pivotally secured to the flue at one side thereof. This control arm, by moving upwardly, will remove the exhaust valve 61 from its normal position on the end of the flue, 53, so as to permit any gas in the exhaust chamber 52 to exhaust to the atmosphere.

The flexible controls 59 are secured to the exhaust valve 61, and a suitable length of slack is provided in the controls 59 so that the exhaust valve 61 may move upwardly a slight distance from its valve seat in order that gas in the flue 53 may exhaust from the flue without unseating the valves 56 from their seats in the flues 54. Hence, gas pressure can be retained in the pontoons while exhaust gas from the combustion motor of the tank flows through the expansion chamber 52, and out through the exhaust flue 53. Upon moving the control arm 62 an appreciable distance upwardly, so as to move the exhaust valve 61 farther from its valve seat, the controls 59 will become taut and pull the valves 56 from their seats so that gas in the pontoons will exhaust back through the tubes 55, the flues 54, and out the exhaust flue 53. A spring 63 is carried on a rod 64 associated with the control arm 62 in such a manner that the spring 63 urges the valve 61 onto its seat on the end of flue 53 when the control arm is in its closed position. This spring will be compressed when the desired gas pressure is set up within the exhaust flue 53. For example, when the valves 56 are open, and the valve 61 is closed, the spring 63 would be compressed to permit gas to escape from the flue 53, without being forced to discharge into the pontoons and set up excessive pressures therein. Preferably, control means operable from within the tank are provided for the exhaust valve 61 and its associated valves 56. Such means may include a cable 66 that is secured to the end of the control arm 62, and extends therefrom both upwardly and downwardly to a control point (not shown) within the tank. A further control cable 67 is connected to a catch arm 68, so that the catch 68 may be released when desired. Release of the catch 68 permits the cable 66 to be used to draw the exhaust valve 61 up from its seat on the flue 53. The association of the cables 66 and 67 is such that cable 66 normally prevents vertical movement of the arm 62 as is required to free the valves 56 from their seats. This position of the controls is considered to be satisfactory for the general or normal operating condition, since it permits the exhaust gas from the tank's internal combustion engines to exhaust to the atmosphere, but would retain any pressure set up within the pontoons. When no pressure is desired in the pontoons, then the cable 66 should be moved so as to draw the arm 62 and the valve 61 to its uppermost position whereby the valves 56 are also opened by means of the control cables 59.

It will be realized that in operation the pontoons 31 may be perforated by small arms gun fire. In such case, it would be desirable to operate the inflation system with the valves 61 or 56 all in their closed positions, as set up by the controls therefor. Then, when excessive pressures would be set up in the flue 53, the spring 63 would be compressed and gas would exhaust through such valve; but if the pressures within the pontoons have been reduced, then the gas pressure within the tube 54 would force the valves 56 from their seats, and gas would flow into the pontoons. It will be realized that there is a large volume of gas available for inflation purposes whenever the motors of the tank are in operation but that the specific volume would, of course, depend upon the speed with which the motors were operated, together with the pressures desired within the pontoons.

Figs. 6 and 7 indicate the connection of each of the flexible tubes 55 to one of the pontoons 31 of each series of pontoons associated with the sides of the tank. Note that each of the tubes 55 connect to one pontoon. Gas from such pontoon flows to the pontoons associated therewith through suitable connecting means or holes formed in adjacent pontoon walls that are secured together or siamesed in any desired manner. Such connecting means should connect each pontoon to all adjoining pontoons. In constructing the pontoons 31 they preferably are made from vulcanized fabric material of suitable strength and composition to resist the flexing, gases, heat, pressure, atmosphere, salt water, and other conditions to which the pontoons will be subjected. Normally, a good rubberized fabric can be cemented together to form the chamber which will stand up to about 15 pounds per square inch pressure; whereas, it is contemplated that only about 3 pounds per square inch pressure is required on the pontoons for normal operation. Figure 2 indicates that the pontoons 31 extend substantially the length of the tank 30, but that they are positioned closer to the front of the tank than to the rear. This aids in maintaining the tank on an even keel when being driven through water and prevents the tank from nosing under. Also, the pontoons, when in use, do not limit the approach and leave angles of the tank. In some instances, it may be desirable to have the upper pontoons protrude forwardly of the lower pontoons, while it also may be desirable to have the pontoon noses beveled off towards the rear of the pontoon from top to bottom of the pontoon, in order to make the tank more seaworthy.

Propellers 71 are provided for furnishing the drive means for the tank 30 when in water. These propellers 71 are carried on drive shafts 72 which connect to universal joints 73. The propeller drive shafts 72 extend through and are journalled in blocks 70 that are mounted in arcuate slots 74 formed in brackets 75 mounted on the tank 30 for pivotal horizontal movement. Thus, the propellers 71 can be moved to various horizontal positions with relation to the tank, as desired. Also, the propellers are free to move vertically in case they strike any obstruction in the water. Means, hereinafter discussed, may be provided to swing the propeller through a horizontal arc to aid in the steering of the tank when in water. However, it has been established that such steering control is not always necessary and that suitable steering may be effected, in most instances, by controlling the drives of the twin propellers by individual control of the drives of the endless tracks which are used to supply power to the propellers, as hereinafter set forth. Then the propellers would not require horizontal movement and could be mounted on brackets fixedly secured to the tank.

Preferably, the propellers 71 are driven from the standard drive means used on the tank 30. That is, the combustion engine means (not shown) for driving the tank connect through suitable power transmission means (not shown) to the block tracks 79 to drive them. To this end, universal joints 73 are connected to output shafts 76 that are associated with gear boxes 77, which are bolted to or otherwise mounted on brackets 78 carried by the tank 30 at the rear portion thereof immediately adjacent rear idler wheels 80 for the block track 79 used in driving the tank when on land. These gear boxes are provided with splined input shafts 81 extending therefrom, which shafts are adapted to extend to a point adjacent the axles of the idler wheels 80 of the block track and be engaged ro coupled thereto by means of members 80a secured to the wheels 80. Hence, the standard drive of the tank 30, used to drive the block track 79, will simultaneously drive the output shafts 81 of the gear boxes 77. This, in turn, drives the propeller shafts 72 that are connected to the gear boxes through the universal joints 73. Suitable gear design of the boxes 77 provides the desired revolutions per minute for the propellers 71.

Fig. 5 of the drawings illustrates that a control arm 82 may be carried to one of the brackets 75, positioning one of the propellers 71, so that the relative horizontal position of same can be controlled by such arm. A link 83 extends between and is connected to both brackets 75, so that movement of the two brackets, and consequently the position of the propellers 71, is properly correlated. Then any suitable control means (not shown) may be provided for the control arm 82, whereby the position thereof can be regulated from the inside of the tank 30.

Air for the motors used in the tank is drawn in through a standard deep fording intake flue 91, while a deep fording exhaust flue 92 also is provided, which flue receives any gases passing through the exhaust valve 61. Obviously, both flues 91 and 92 must extend to a point adjacent the top of the tank so as to be operative when the tank is in the water.

Figure 13:
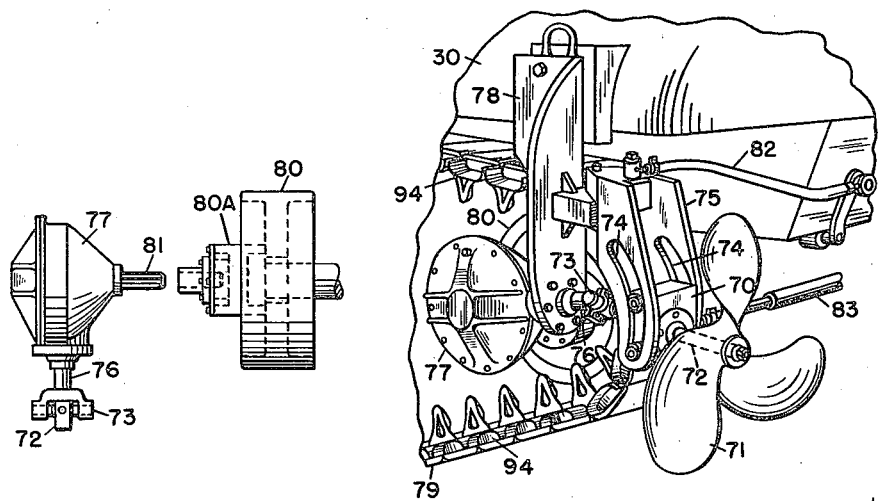
Fig. 13 is a fragmentary perspective view of the propeller drive means, while a partially exploded view of such means also is shown therein.

Fig. 1 shows that shields 93 may be provided for the front (and exposed) section of the endless track blocks 79, which shields are suitably secured to the tank. The flotation of the tank 30 on soft or marshy soil is aided by roughly cup shaped track extensions 94 that are bolted to the ends of the track block 79, as best shown in Fig. 13.

Figure 14:
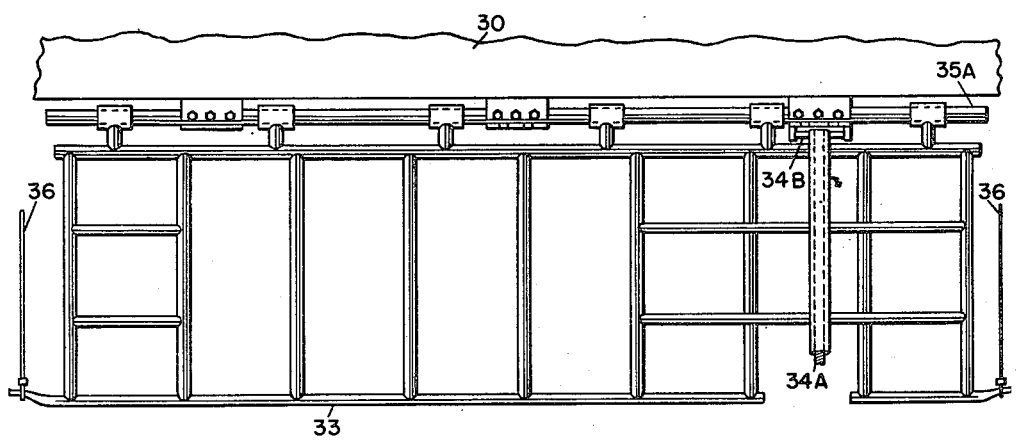
Fig. 14 is a plan of the pontoon supporting rack, and its support.

The support racks 33 are best illustrated in Fig. 14 that shows the open construction thereof and brings out that an outer section of the racks is omitted so as to facilitate the folding of the racks with relation to the cables 34a. When desired, a metal covering may be applied to the racks so as to protect the pontoons against snagging on under water objects.

It is seen that a periscope 95 is provided on the tank 30 to facilitate operation thereof in water with the turret of the tank closed.

Figure 15:
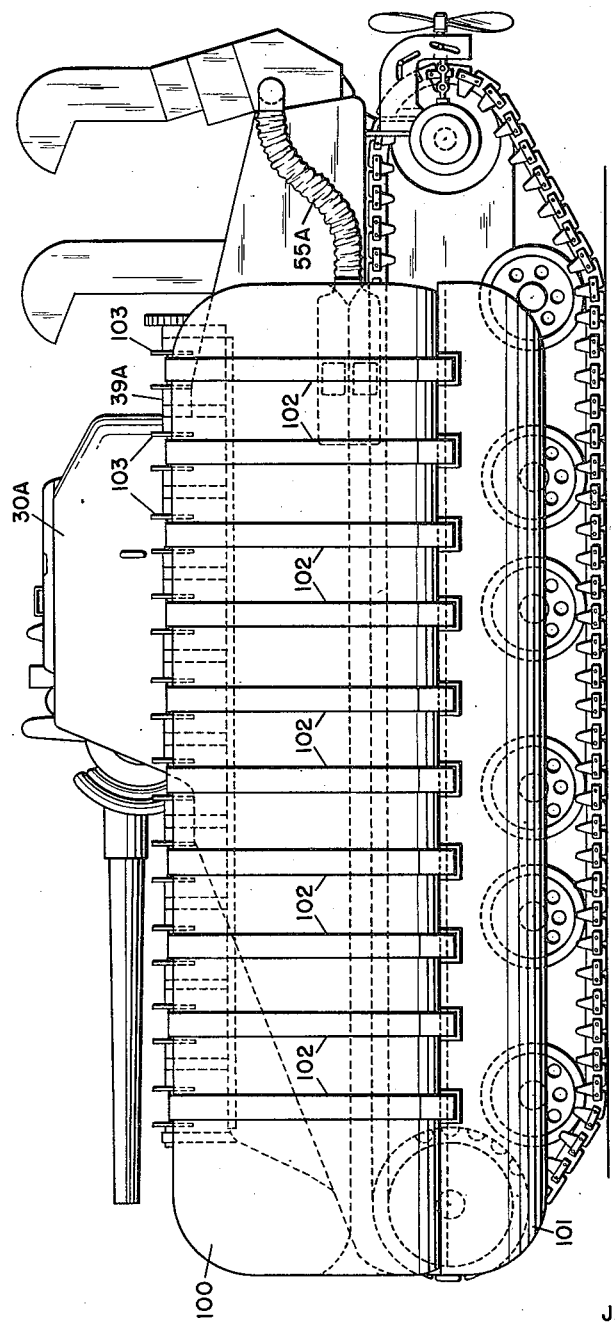
Fig. 15 is a side elevation of a modification of the invention.
Figure 16:
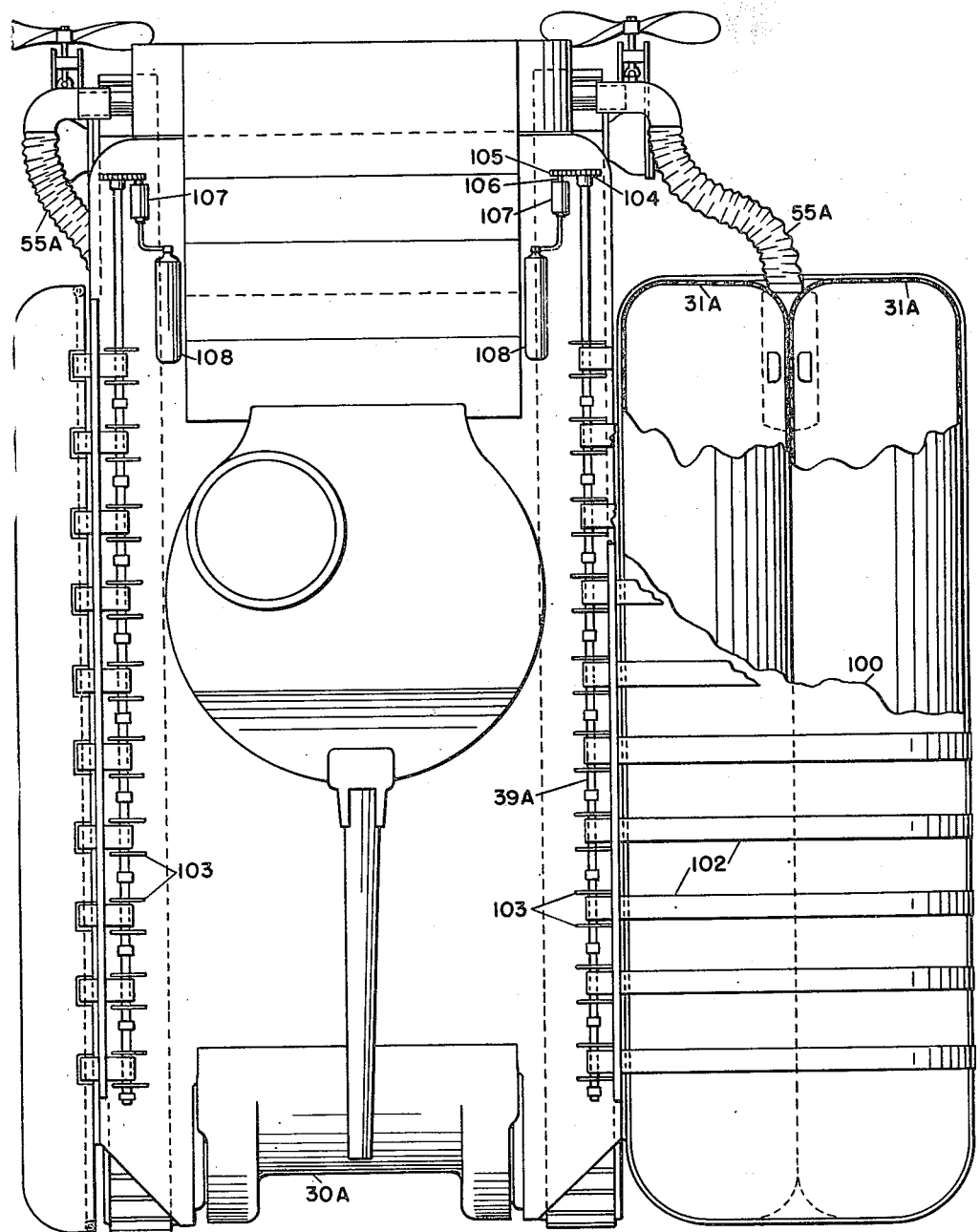
Fig. 16 is a plan of the modified armored vehicle shown in Fig. 15, with one of the pontoons thereon being shown in its inflated position.

In a modification of the invention shown in Figs. 15 and 16, there is provided slightly different means for positioning the pontoons on the tank. In this instance, a tank 30a is provided with pontoons 31a and has a lower shield 101 provided therefor, while the pontoons 31a are enclosed in a cover 100. Such shield 101 is pivotally secured at its inner edge to the lower portion of the tank 30a. Then, a plurality of flexible bands 102 are secured to the outer edge of the shields 101, extend around the pontoons 31a, and are secured to tubular members 39a which are journalled on the upper surface of the tank. The tubular members 39a are positioned adjacent the sides of the tank and extend substantially the length of the shields 101. Guide discs 103 may be positioned on the tubular members 39a for limiting the position of the bands 102, as the bands are rolled onto the tubular members when the pontoons are deflated. Any desired control apparatus may be provided to rotate the member 39a, whereby the pontoons can be deflated when their exhaust ports are open, or else freed for inflation, as desired. In this instance, gears 104 are carried at the rear ends of the members 39a, which gears engage with gears 105 on shafts 106 of small air motors 107. The air motors 107 are connected to compressed air cylinders 108 and to suitable means (not shown) inside the tank 30, whereby movement of the member 39a and inflation and deflation of the pontoons can be controlled from within the tank.

It will be noted that the pontoons 31a are all connected to the flexible tube 55a, used in inflating the pontoons.

It will be seen that, in general, the amphibious vehicle shown in Figs. 15 and 16 of the drawings is constructed similarly to the vehicle shown in the other drawings, and that the operation and inflation of the pontoons, and other performance of the tank 30a are substantially the same as that of the tank 30.

In some instances, it may be desirable to mount a prow assembly on the inclined portion of the front of the tank to make the tank more seaworthy. This prow could be made from two pieces of sheet metal hinged on the tank and adapted to be raised up and secured in such position when in use. Obviously, the shape and size of the pontoons may be varied with the flotation desired. The pontoons shown have been very effective with the tank shown.

Tanks or other vehicles manufactured as land vehicles can be adapted in the field for amphibious operation, it will be seen, by practice of the teachings of the invention. Modification kits including pontoons, flotation pans, racks, tension arms, cables, pan and rack synchronization means, brackets, expansion chambers and connecting means, propellers and assemblies, and gear boxes could be attached to a tank or other vehicle with a small amount of welding and cutting so as to convert the tank into an amphibious vehicle. This is especially easily done if the tank initially has deep fording equipment thereon.

While several embodiments of the invention have been fully illustrated and described herein, in accordance with the patent statutes, it will be realized that the scope of the invention is not limited to the embodiments of the invention shown herein, but that the scope of the invention is covered in and defined by the appended claims.

What is claimed is:

1. In combination with a land and marine vehicle, a vehicle body whose weight is substantially greater than the weight of water it displaces, endless land traction tracks, combustion engine vehicle driving means, power transmission means connecting said engine and said tracks, flotation pans, said pans being attached to the upper portion of said body in hinged relation at the sides thereof, a plurality of inflatable collapsible pontoons substantially as long as said body, said pans being composed of heavy bullet resisting material and being adapted to overlie said pontoons and to transmit their flotation lift to said vehicle, pontoon under support structures, said under support structures being hinged to said body at the lower portion of each side thereof, several of said pontoons being sandwiched between each pair of said lifting pans and said under supports at the sides of said vehicle body, said pontoons when deflated being pressed against the sides of the vehicle structure by said under supports with said pans lapped downwardly over said under supports, the individual members of said pontoons associated on each side of said vehicle having their chambers intercommunicating, an exhaust gas expansion chamber, means adapted to convey exhaust gas from said engine to said pontoons through said expansion chamber, pressure control means in communication with said gas conveying means and adapted to shut off the gas from said pontoons and to discharge the engine exhaust gas to the atmosphere when desired, said pressure control means regulating the exhausting of said pontoons, means connecting said pans and said under supports and comprising gears and cams actuated by the movement of said pans, said pans moving downwardly by gravity when said pontoons are open to exhaust the gas therein and upwardly by the lifting power of said pontoons during the period of inflation of said pontoons, said gear and cam means being so constructed and arranged that the downward movement of said pans causes the said lower support structures to move upwardly revolving about the axes of their hinges faster than said pans revolve about the axes of their hinges, and marine vehicle propulsion means actuated by said vehicle driving means through said endless land traction tracks.

2. In combination with a land and marine vehicle, a vehicle body whose weight is substantially greater than the weight of water it displaces, flotation pans, said pans being attached to the sides and extending substantially the length of said body in hinged relation, a plurality of inflatable collapsible pontoons, said pans being composed of heavy bullet resisting material and being adapted to overlie said pontoons and to transmit their flotation lift to said vehicle, pontoon under support structures, said under support structures being hinged to the lower sections of the sides and extending substantially the length of said body, said pontoons when inflated being sandwiched between said lifting pans and said under supports, said pontoons when deflated being pressed against the sides of the vehicle structure by said under supports with the said pans being lapped downwardly over said under supports, said pontoons on each side of said vehicle having their chambers intercommunicating, pontoon outlet ports, means for opening and closing said ports, and means connecting said pans and said under supports and comprising gears and cams actuated by the movement of said pans, said pans moving downwardly by gravity when said gas outlet ports of said pontoons are open and upwardly by the lifting power of said pontoons during the period of expansion of said pontoons, said gear and cam means being so arranged that the downward movement of said pans causes the said lower support structures to move upwardly revolving about the axes of their hinges faster than said pans revolve about the axes of their hinges.

3. In combination with a land and marine vehicle, a vehicle body whose weight is substantially greater than the weight of water it displaces, combustion engine vehicle driving means, flotation pans, said pans being attached to said body in hinged relation, a plurality of inflatable collapsible pontoons, said pans being composed of heavy bullet resisting material and being adapted to overlie said pontoons and to transmit their flotation lift to said vehicle, pontoon under support structures, said under support structures being hinged to said body, said pontoons when inflated being sandwiched between said lifting pans and said under supports, said pontoons when deflated being pressed against the sides of the vehicle structure by said under supports with said pans lapped downwardly over said under supports, said pontoons on each side of said vehicle having their chambers intercommunicating, an exhaust gas expansion chamber, means adapted to convey exhaust gas from said engine to said pontoons through said expansion chamber, a variable pressure exhaust valve associated with said expansion chamber, pontoon outlet ports associated with said gas conveying means, means for opening and closing said ports, and means connecting said lifting pans and said under supports and comprising gears and cams actuated by the movement of said pans, said pans moving downwardly by gravity when said gas outlet ports of said pontoons are open and upwardly by the lifting power of said pontoons during the period of expansion of said pontoons, said gear and cam means being so arranged that the downward movement of said pans causes said lower support structures to move upwardly revolving about the axes of their hinges faster than said pans revolve about the axes of their hinges.

4. In combination with a land and marine vehicle, a vehicle body whose weight is substantially greater than the weight of water it displaces, endless land traction tracks, combustion engine vehicle driving means, power transmission means connecting said engine and said tracks, a plurality of inflatable collapsible pontoons, means for inflating said pontoons, drive means removably connected to said power transmission means at a point outside of said vehicle body, propeller means, means coupling said propeller means to said drive means so that the said propeller means can be driven by said driving means, and means for controlling said propeller means so as to effect steering of the vehicle when in water.

5. In combination with a land and marine vehicle, flotation pans, said pans being attached to said vehicle in hinged relation, a plurality of inflatable collapsible pontoons having outlet ports, said pans being composed of heavy bullet resisting material and being adapted to overlie said pontoons and to transmit their flotation lift to said vehicle, pontoon under support structures, said under support structures being hinged to said vehicle, shafts journalled on said vehicle, gearing means connecting said shafts to said pans, cam shafts carried by said vehicle, a cam carried by each of said cam shafts, and means connecting said cam shafts to said under support structures, said pans moving downwardly by gravity when the gas outlet ports of said pontoons are open and upwardly by the lifting power of said pontoons during the period of expansion of said pontoons, said gear and cam means being so arranged that the downward movement of said pans causes the said lower support structures to move upwardly revolving about the axes of their hinges faster than said pans revolve about the axes of their hinges.

6. In an amphibious armored vehicle, the combination of pontoons, relatively heavy shields pivotally secured to said vehicle and positioned on the upper surface of said pontoons when same are inflated, bottom racks for said pontoons pivotally secured to said vehicle and adapted to position the lower surfaces of said pontoons, and means for securing together and correlating the movement of said shields and said racks when said pontoons are deflated so as to control the deflated positions thereof, said shield means being adapted to compress and deflate said pontoons by the pull of gravity on said shields when said pontoons are opened for exhaust purposes.

7. A modification kit for attachment to an armored land vehicle to render same amphibious, which kit comprises collapsible pontoons, flotation pans, lower supporting racks, said pans and racks being adapted to be secured to a vehicle and have said pontoons sandwiched therebetween, a gas expansion chamber, means for connecting said chamber to the exhaust system of a vehicle, means for connecting said expansion chamber to said pontoons, propeller means, means for mounting said propeller means on a vehicle, and means for connecting said propeller means to a driven member on a vehicle.

8. In an amphibious armored vehicle, the combination of inflatable flotation pontoons, top armored shields pivotally secured to said vehicle for shielding upper surfaces of said pontoons, bottom racks pivotally secured to said vehicle for positioning lower surfaces of said pontoons, and movement synchronization means connecting said shields and racks, said means correlating pivotal movement of said shields and racks when said pontoons are deflated so as to control deflated positions thereof.

9. In an amphibious armored vehicle powered with an internal combustion engine, the combination of an expansion chamber, fluid communication means connecting the exhaust of said engine to said expansion chamber, collapsible inflatable shielded flotation pontoons secured to said vehicle for supporting the latter in water, fluid communication means connecting said expansion chamber to said pontoons, and an automatic valve in said fluid communication means, said valve being responsive to a predetermined desired inflation pressure in said pontoons to automatically exhaust gas from said expansion chamber to the atmosphere.

10. A flotation kit for attachment to a land vehicle powered with an internal combustion engine comprising, in combination, collapsible flotation pontoons for inflatedly supporting said vehicle in water, shield means for shielding upper surfaces of said pontoons, cover means for positioning lower surfaces of said pontoons, means for pivotally securing said shield means and said cover means to sides of said vehicle with said pontoons sandwiched between said shield means and said cover means, movement synchronization means for connecting said shield means and said cover means for correlating pivotal movement thereof on deflation of said pontoons, a gas expansion chamber, means for connecting said chamber in fluid communication to the exhaust of said engine, and means for connecting said chamber in fluid communication to said pontoons.

JAMES E. HALE.
JOHN H. COX.
JOHN G. KREYER.

REFERENCES CITED

The following references are of record in the file of this patent:

UNITED STATES PATENTS

| Number | Name | Date |
| --- | --- | --- |
| D. 137,812 | Myers | May 2, 1944 |
| 1,076,466 | Thomas | Oct. 21, 1913 |
| 1,180,013 | Cook et al. | Apr. 18, 1916 |
| 1,312,355 | Reid | Aug. 5, 1919 |
| 1,345,326 | MacDonald | June 29, 1920 |
| 1,530,577 | Scruby | Mar. 24, 1925 |
| 1,615,389 | Julich | Jan. 25, 1927 |
| 2,336,906 | West | Dec. 14, 1943 |
| 2,341,165 | Todd | Feb. 8, 1944 |
| 2,390,747 | Straussler | Dec. 11, 1945 |
| 2,397,791 | Kramer et al. | Apr. 2, 1946 |

FOREIGN PATENTS

| Number | Country | Date |
| --- | --- | --- |
| 11,879 | Great Britain | May 21, 1913 |
| 622,540 | Germany | Nov. 30, 1945 |